United States Patent [19]

Hilchey et al.

[11] Patent Number: 4,476,643
[45] Date of Patent: Oct. 16, 1984

[54] HAND CONTROL SYSTEM FOR MOTORIZED IMPLEMENTS

[75] Inventors: Robert M. Hilchey, Kitchener; Arne I. Fors, Nobleton, both of Canada

[73] Assignee: MTD Products Limited, Kitchener, Canada

[21] Appl. No.: 473,387

[22] Filed: Mar. 8, 1983

[51] Int. Cl.³ .......................... E01H 5/09; G05G 1/04
[52] U.S. Cl. ........................................ 37/245; 74/523; 56/11.8; 180/19.3
[58] Field of Search ...................... 74/523, 479, 471 R; 56/10.5, 11.3, 11.8; 37/243, 244, 245; 180/19.3

[56] References Cited

U.S. PATENT DOCUMENTS

| 3,942,604 | 3/1976 | Black | 180/19.3 X |
| 4,221,108 | 9/1980 | Owens | 56/10.5 X |
| 4,230,200 | 10/1980 | Carolan | 180/19.3 X |
| 4,362,228 | 12/1982 | Plamper | 56/11.3 X |
| 4,428,180 | 1/1984 | Carlson | 56/10.5 X |
| 4,430,848 | 2/1984 | Wistrom | 56/10.5 X |

FOREIGN PATENT DOCUMENTS 2517684 11/1975 Fed. Rep. of Germany ....... 56/11.3

Primary Examiner—Gary L. Smith
Assistant Examiner—Adrian H. Whitcomb, Jr.
Attorney, Agent, or Firm—Arne I. Fors; Robert F. Delbridge

[57] ABSTRACT

A hand control system for a motorized implement such as a snowblower, lawn mower or tiller having a U-shaped handle in which a pair of control levers and a U-shaped bail are pivotally mounted on the handle such that the control levers can be pivoted independently or conjointly by the bail from a first, at-rest, inoperative position distal from the handle to a second, operative position proximate to the handle. The bail co-operates with the control levers to permit sequential activation of one control lever before the other for improved operation of the implement, permits one-handed control of the implement from various positions on the implement handle, and at all times maintains the safety feature of a "deadman" control.

9 Claims, 5 Drawing Figures

HAND CONTROL SYSTEM FOR MOTORIZED IMPLEMENTS

This invention relates to a hand control system for a motorized implement such as a snowblower, tiller or lawn mower.

Motorized hand implements such as snowblowers, lawn mowers and tillers are often handled by unskilled operators and therefore can be dangerous unless they are very carefully designed. They are generally controlled by a combination of levers mounted on a handle. The levers control functions such as engine speed, engagement of driving wheels, and engagement of a blade or auger, and the handle is used to steer the implement. The handle often consists of two spaced-apart metal tubes, bent so that the ends of the handle are parallel to the ground, facing rearwardly, but operator control can be improved and fatigue lessened by providing a one-piece handle which is generally U-shaped when viewed from above and which may be gripped in several different ways and at several places along its length. Furthermore, control of the implement can be improved with a U-shaped handle, particularly when turning the implement, if the operator can grip the handle at one side or the other, thus exerting leverage on the handle.

The control levers are usually provided with a safety "deadman" feature, so that the drive wheels, auger or blade is disengaged when the control levers are released by the operator in case the operator should fall or lose his grip on the implement. This may give rise to problems when the implement is in use because the operator may wish to remove his hand from one lever, for instance the drive control, in order to adjust another lever, for instance engine speed. If he does so, at least one of the functions controlled by a deadman lever will stop, which may be inconvenient. As a result of this potential inconvenience, the operator may lock or jam the lever, defeating this safety feature and possibly causing a serious accident.

Some control systems partly overcome this problem by ensuring that one of the levers is held down when the other is depressed, thus permitting one-handed operation by depressing a second lever only. The disadvantage to this system is that the operator cannot chose to use the second lever independently, for when it is depressed so is the first lever.

Another system has two levers placed in proximity to each other so that they may be operated independently by one hand on each lever, or operated together, held by a single hand positioned between the two levers. The disadvantage to this system is that the operator's hand must be positioned between the two levers to grasp closely opposed ends of the levers and cannot be moved along the handle to achieve a more convenient position to guide the machine.

It is to be emphasized that an inconvenience of this nature to the operator who is not necessarily a skilled professional may result in the operator jamming the deadman lever and defeating the safety features which are designed into the implement control mechanism or may lead to premature fatigue on the part of the operator. Thus, increased convenience results in safer, less tiring and more comfortable operation of the implement.

This invention provides a control system for a motorized implement comprising: a U-shaped handle; two control levers pivotally mounted on the U-shaped handle, one end of each being pivotally moveable from a first inoperative position distal from the handle to a second inoperative position proximate to the handle; a U-shaped bail, pivotally mounted on the U-shaped handle, the bight of which being pivotally moveable from a first position distal from the handle to a second position proximate to the handle, said bail adapted to bear against the control levers and move them from their first positions to their second positions when the bail is pivoted from its first position to its second position; and means for normally biasing the control levers and means for biasing the U-shaped bail to their first positions distal from the handle, whereby each control lever may be independently pivoted from its first to its second position, or both control levers may be conjointly pivoted by the bail from their first to their second positions.

In one aspect of the invention, the control levers are pivotally mounted in proximity to the pivotal mounting of the bail. In another, the relative positions of the levers are adapted so that if the bail is squeezed towards its second position proximate the handle, first one lever and then the other is moved from its first towards its second activated position. This aspect allows one function to be engaged before the other.

It will be seen that this invention allows the operator to change his grip on the handle to avoid fatigue and to grip at one end or the other of the handle. In addition, the control permits single handed use of the machine.

Referring to the drawings.

Figure 1:
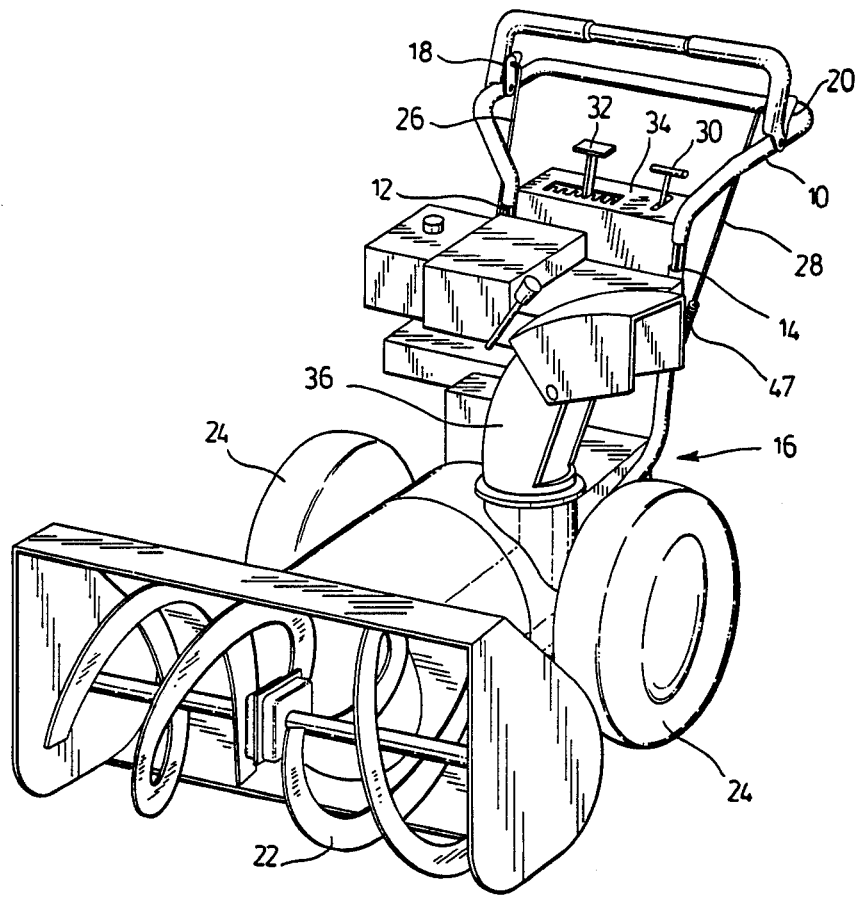
FIG. 1 is a perspective view of a snow blower showing an embodiment of the invention mounted thereon.
Figure 2:
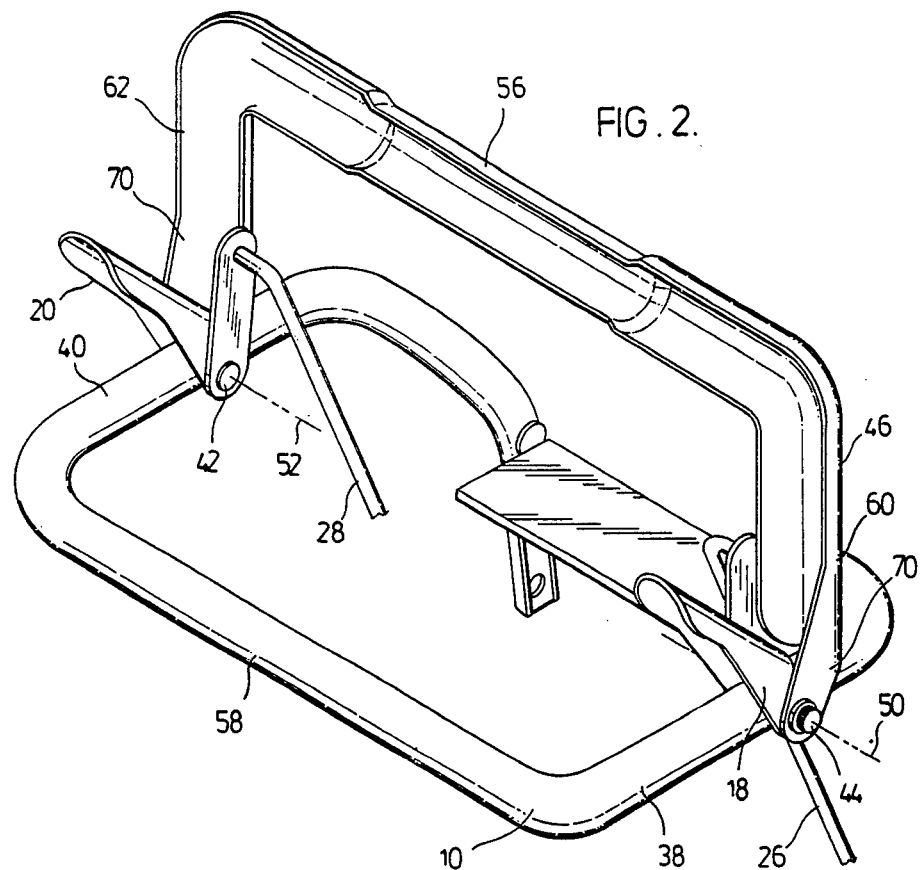
FIG. 2 is a perspective view of the same embodiment in more detail.

With reference to FIGS. 1 and 2 of the drawings, the hand control system of the present invention comprises a generally U-shaped, horizontally-disposed, tubular handle 10 having side extensions 12, 14 extending downwardly for securement to the opposite sides of snow blower depicted by numeral 16. Although the description of the hand control system of the invention will proceed with reference to a snow blower, it will be understood that the hand control system can be incorporated with and comprise the hand control system of a garden tiller, lawn mower or the like motorized implement.

Two control levers 18, 20 engage the auger 22 and drive wheels 24 respectively of the snowblower, acting through linkages 26 and 28. The throttle 30 which controls engine speed and gear shift selector 32 are located separately on console 34. The discharge chute 36 is turned to a desired direction by a screw control, not shown.

Control levers 18, 20 are pivotally mounted on handle 10, preferably one on each side thereof on side portions 38, 40, as shown most clearly in FIG. 2, by means of pins 42 secured by caps 44 threaded thereon passing through the handle portions 38, 40. U-shaped bail 46 is pivotally connected to the side portions 38, 40 of handle 10 by pins 42 common to levers 18, 20. The bail 46 and levers 18, 20 thus pivot about the same axes 50, 52, axes 50, 52 normally being in co-axial alignment.

Figure 3:
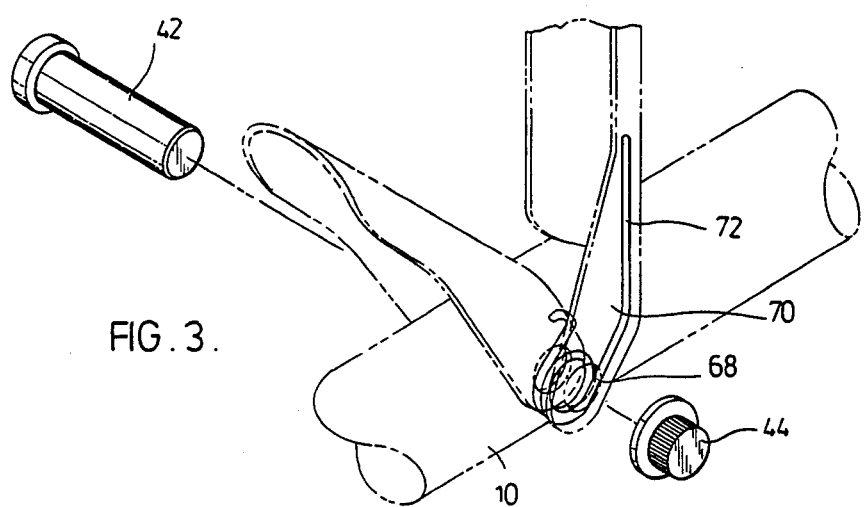
FIG. 3 is a partially exploded view of a lever and bail pivotal mounting on the handle.

Bail 46 is semi-circular in section having a reduced radius in centre section or bight 56 to closely abut and envelop the web 58 of handle 10 and an enlarged radius in side sections 60, 62 to accommodate levers 18, 20 which are curved in cross-section to closely abut and envelop side portions 38, 40 of handle 10. Pins 42 pass through openings 68 formed in lugs 70 extending from side sections 60, 62 of bail 46. A torque spring 72 mounted on at least one pivot pin 42, FIG. 3, is adapted to operatively engage lever 18 and bail 56 such that the bail 46 and lever 18 are urged angularly apart about axis 50.

Each of levers 18, 20 is urged to a first, at-rest position distal, i.e. remote, from handle 10 by means of respective linkages 26, 28 which are urged downwardly by tension springs 47 or the like biasing means, well known in the art. Levers 18, 20 thus are normally biased to their respective first at-rest inoperative distal positions shown in FIG. 2 by linkages 26, 28 and bail 46 normally is biased to its first at-rest inoperative distal position by one or more torque springs 72. A second torque spring, not shown, may be operatively inserted between lever 20 and bail 46 to in like manner further urge the levers and bail 46 angularly apart.

The use of a single torque spring 72, such as for lever 18, can result in preliminary depression of lever 18 relative to lever 20 by depression of bail 46 provided the biasing means for linkage 26 is weaker than torque spring 72. Thus, the function controlled by lever 18, such as for example auger 22, can be actuated prior to the function controlled by lever 20, such as drive wheels 24. Torque springs 72 of different strengths may be used, one for each of levers 18, 20, wherein the uses of a torque spring for lever 18 weaker than the torque spring for lever 20, provided the biasing means for linkages 26, 28 are weaker than both torque springs, permits lever 18 to be depressed prior to the depression of lever 20 by actuation of bail 46 against handle 10. Auger 22 thus can be actuated prior to drive wheels 24 by slowly actuating bail 46.

Figure 4:
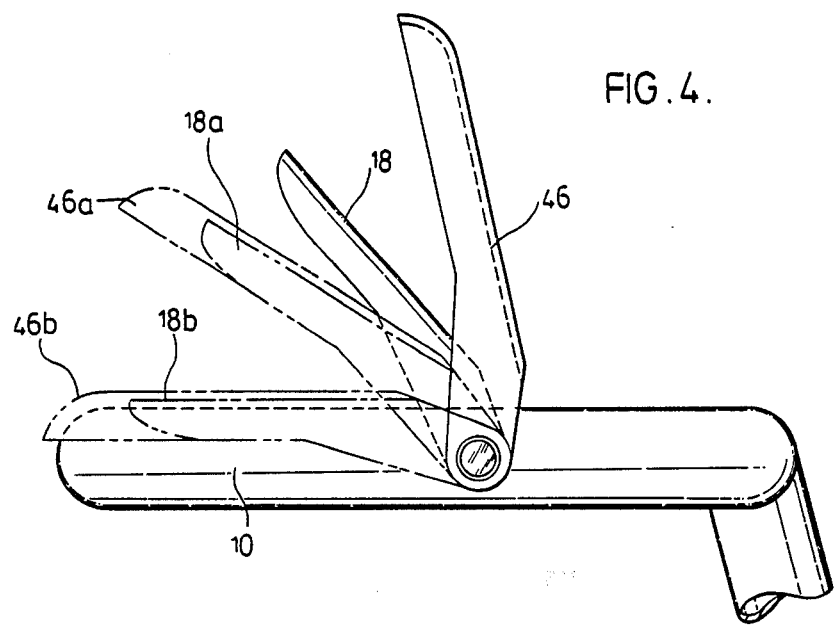
FIG. 4 is a side elevation of the embodiment shown in FIG. 2.

Torque spring 72 can be weaker than the biasing means connected to linkage 26 such that actuation of bail 46 does not actuate lever 18 until bail 46 abuts lever 18, as depicted in FIG. 4. Lever 18 can thus be pivotted from the at-rest distal position shown by solid lines through position 18a to a second operative position 18b as shown by ghost lines.

Figure 5:
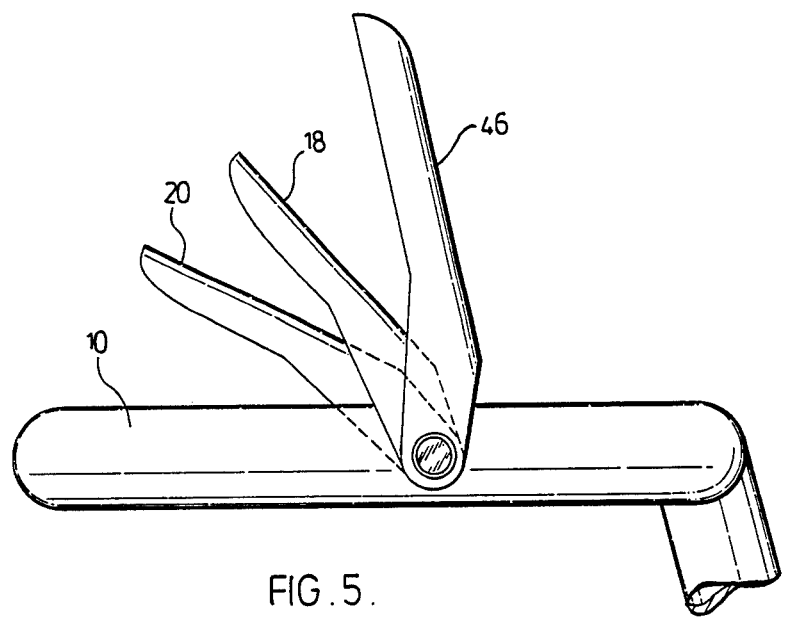
FIG. 5 is a side elevation of another embodiment of the invention.

Alternatively, lever 18 can be positioned at a higher angular at-rest position, as shown in FIG. 5, relative to lever 20, such that lever 18 is actuated by abutment with bail 46 prior to actuation of lever 20, thereby actuating for example auger 22 prior to drive wheels 24.

The operator can thus depress both levers 18, 20 at the same time with one hand, by holding the bail 46 against the handle 10, and the operator will have a free hand to change engine speed or the direction of the snow discharge. He can also grasp the handle at various points with one or both hands while holding the bail down to enable him to steer or control the implement more easily while maintaining the controls operative. In addition, each control lever can be operated independently by the operator inserting a hand between bail 46 and handle 10. For instance, the auger control lever 18 can be actuated to run the auger to clear it of snow without engaging the wheels, and the wheel control lever 20 can be engaged to maneuver the snowblower without the auger running. If any one of the levers is released, the function controlled by the lever will stop since the lever will automatically be returned to its at-rest disengaged or inoperative position by spring 47. If the bail 46 is released, and neither lever 18 or 20 is individually actuated, both levers will return to their disengaged positions and both functions will cease. The control system of the invention is thus convenient enough to use that operators will not be as likely to defeat these safety features.

Although the embodiment is described as it may be used with a snow blower, it can be used with a tiller, a lawn mower, or the like motorized implement if it were desired to arrange a blade or other first function separately from the wheels and to provide the operator the option of controlling both functions together with a single hand, sequentially if desired, or independently with both hands.

It will be understood that modifications can be made in the embodiment of the invention illustrated and described herein without departing from the scope and purview of the invention as defined by the appended claims.

What we claim as new and desire to protect by Letters Patent of the United States of America is:

1. A control system for a motorized implement comprising:
   (a) a U-shaped handle;
   (b) two control levers, pivotally mounted on the U-shaped handle, one end of each being pivotally moveable from a first inoperative position distal from the handle to a second operative position proximate to the handle;
   (c) a U-shaped bail, pivotally mounted on the U-shaped handle, the bight of which being pivotally moveable from a first inoperative position distal from the handle to a second operative position proximate to the handle, said bail adapted to bear against the control levers and move them from their first positions to their second positions when the bail is pivoted from its first position to its second position; and
   (d) means for normally biasing the control levers and for biasing the U-shaped bail to their first positions distal from the handle;
   whereby each control lever may be independently pivoted from its first to its second position; or both control levers may be conjointly pivoted by the bail from their first to their second positions.

2. A control system as claimed in claim 1 in which said control levers are pivotally mounted one on each side of the U-shaped handle in proximity to the pivotal mounting of the U-shaped bail.

3. A control system as claimed in claim 2 in which said control levers and U-shaped bail are pivotally mounted on the same axes.

4. A control system as claimed in claim 3, said means for normally biasing the U-shaped bail comprising a torque spring operatively interposed between at least one control lever and the bail.

5. A control system as claimed in claim 4 in which the means for biasing the said control lever is weaker than the said torque spring whereby the said control lever can be actuated towards its second position before actuation of the other control lever by actuation of the bail towards its second position.

6. A control system as claimed in claim 3, said means for normally biasing the U-shaped bail to its first position comprising a torque spring operatively interposed between each of the control levers and the bail, said biasing means for the control levers being weaker than both said torque springs and one of said torque springs being of different strength than the other whereby the control levers can be actuated from their first positions towards their second positions one before the other by actuation of the bail towards its second position.

7. A control system as claimed in claim 4 wherein one control lever in its first position distal from the handle is at a higher angular at-rest position than the other control lever whereby said one control lever is actuated before the other control lever by actuation of the bail towards its second position.

8. A control system as claimed in claim 1, 2 or 3 wherein said implement is a snowblower and the control lever first actuated controls an auger and the other control lever controls drive wheels.

9. A control system as claimed in claim 5, 6 or 7 wherein said implement is a snowblower and the control lever first actuated controls an auger and the other control lever controls drive wheels.

* * * * *